United States Patent [19]

Bickerstaff

[11] Patent Number: 4,575,967
[45] Date of Patent: Mar. 18, 1986

[54] FLUSH GLASS WINDOW REGULATOR

[75] Inventor: David J. Bickerstaff, West Bloomfield, Mich.

[73] Assignee: Ferro Manufacturing Corporation, Southfield, Mich.

[21] Appl. No.: 623,452

[22] Filed: Jun. 22, 1984

[51] Int. Cl.[4] .................. E05F 11/52; E05F 11/38
[52] U.S. Cl. .................................. 49/211; 49/227; 49/348
[58] Field of Search ................ 49/211, 374, 375, 376, 49/377, 502, 348, 227, 352

[56] References Cited

U.S. PATENT DOCUMENTS

| | | | |
|---|---|---|---|
| 2,979,327 | 4/1961 | Swanson et al. | 49/211 X |
| 4,051,632 | 10/1977 | Fukumoto et al. | 49/227 X |
| 4,168,595 | 9/1979 | Pickles et al. | 49/352 |
| 4,420,906 | 12/1983 | Pickles | 49/375 X |
| 4,494,337 | 1/1985 | Watanabe et al. | 49/374 |

FOREIGN PATENT DOCUMENTS 2435766  2/1976  Fed. Rep. of Germany ........ 49/227

Primary Examiner—Philip C. Kannan
Attorney, Agent, or Firm—Stephenson and Boller

[57] ABSTRACT

The window glass closure for a vehicle window opening occupies a closed position in which its outer surface is substantially flush with the exterior surface of the door or other body portion in which the opening is provided. This is accomplished by guiding the upper edge of the window along a path inclined slightly outwardly of the vehicle as the window completes its upward movement from its lowered open position. It further comprises guiding the lower edge of the window along a path which is inclined substantially outwardly from the vertical as the window reaches upper position. Preferably this is effected by a generally vertical main guide track which receives a follower carried adjacent the upper edge of the window constrained to follow the main guide track. An abruptly inclined diversion track is connected with the main guide track which receives a follower carried adjacent the lower edge of the window and is adapted to depart from the main track and to enter the inclined diversion track portion.

11 Claims, 13 Drawing Figures

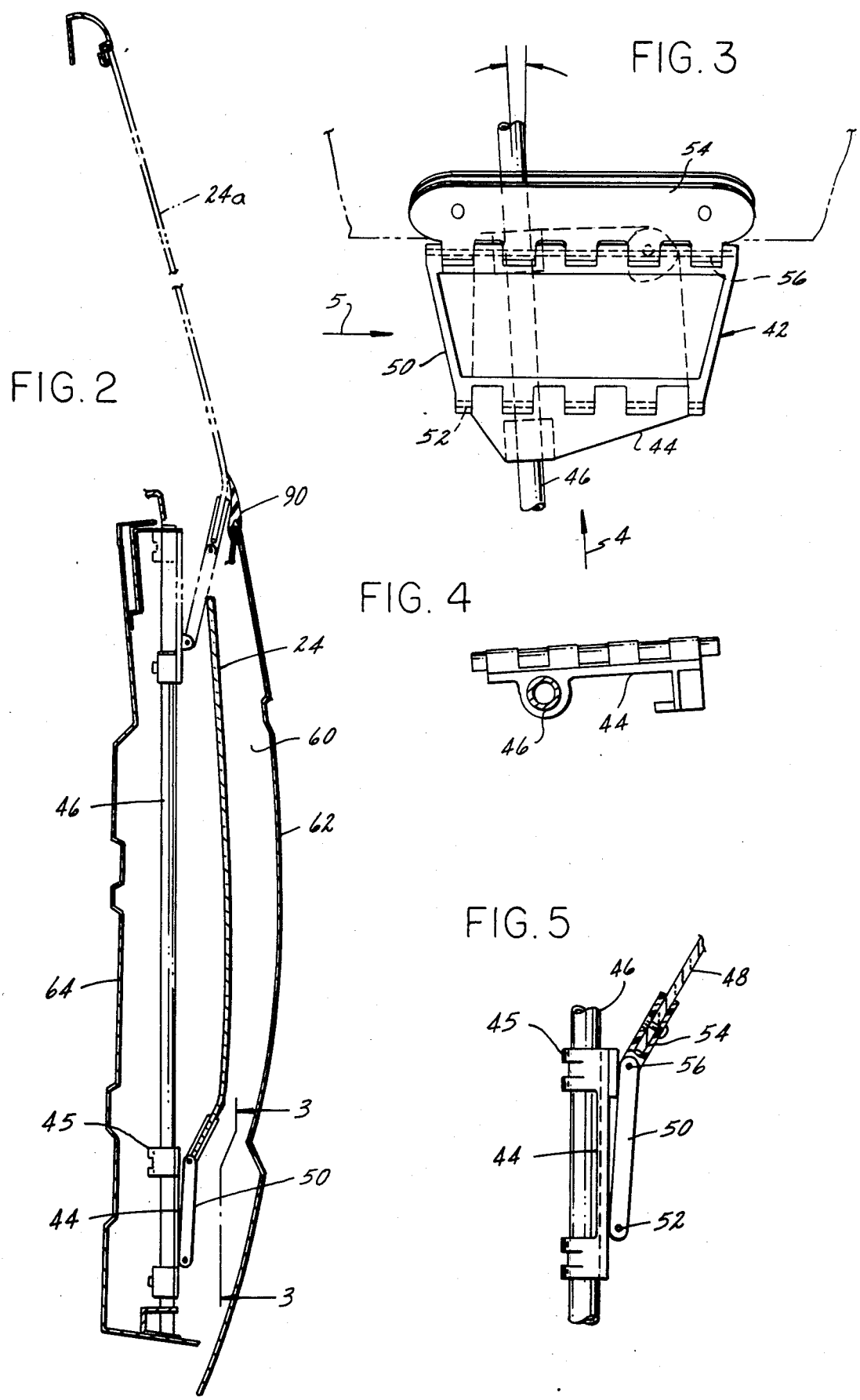

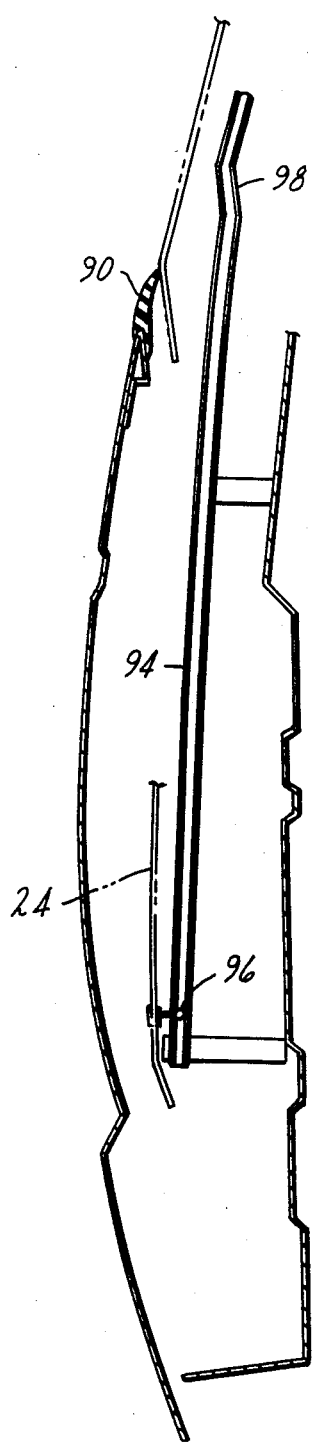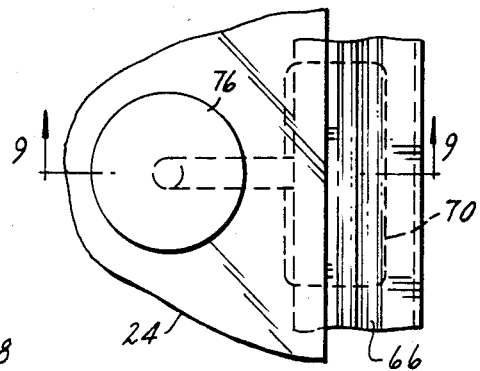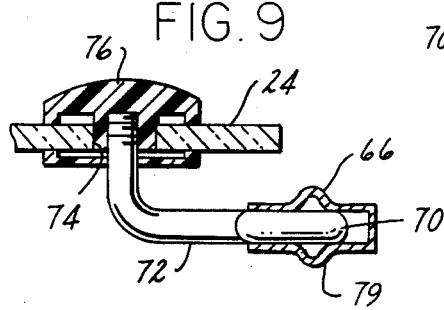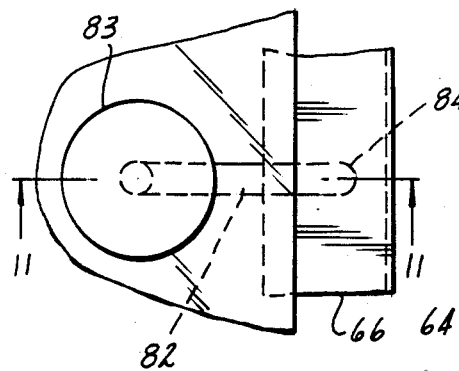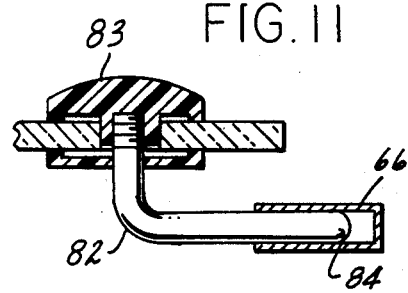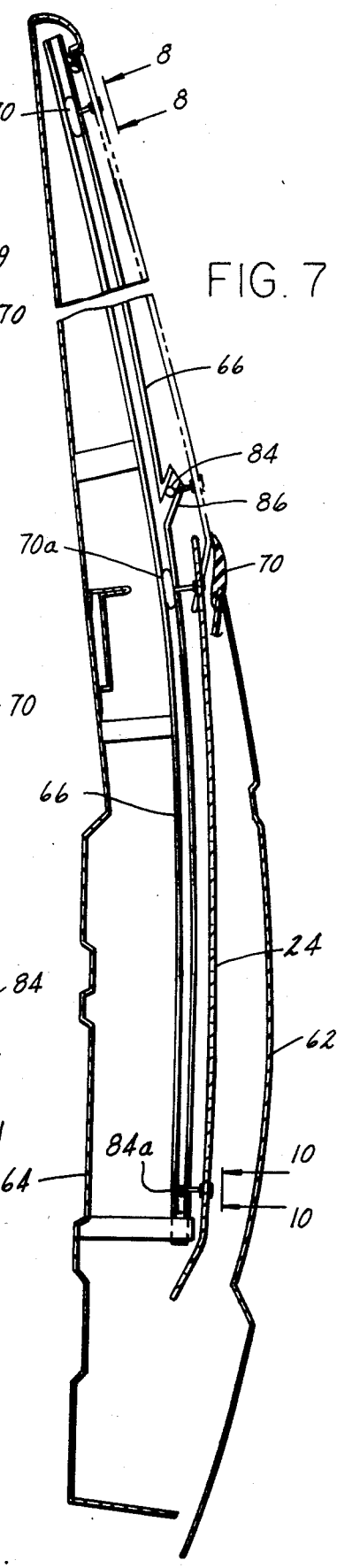

FLUSH GLASS WINDOW REGULATOR

BRIEF SUMMARY OF THE INVENTION

Automotive vehicles are commonly provided with window openings, such as those provided in vehicle doors, and window glass closures are movable from upper closing positions downwardly along suitable guides to positions in which the closures are received within cavities below the window openings. In the past, provision for downward movement of the lower portion of the window has been a slot in the sill or bottom edge of the window opening, and the outer surface of the glass closure has accordingly been spaced inwardly from the outer surface of the door or other body part to leave an external ledge.

In accordance with the present invention, as the upper edge of the window glass is guided into engagement with sealing means, the lower edge is guided outwardly into engagement with a seal having an inwardly facing sealing surface which causes the outer surface of the glass to become substantially flush with the outer surface of the vehicle body or door and to constitute a smooth continuation thereof.

The window is raised or lowered by conventional actuator means including a lift slide movable along a generally vertical guide, the slide having a pivoted arm connecting the slide to the lower edge of the window to provide for outward movement of the lower edge of the window away from the guide into its flush postion as described.

Preferably this is accomplished by providing a main track in the form of a channel in which a follower secured to the window adjacent an upper corner thereof is movable. The main track is connected to a short inclined diversion track also in the form of a channel. The window glass adjacent a lower corner thereof, is provided with a second follower so shaped as to permit its departure from the main track and entry into the short inclined diversion track. Means are provided biasing the follower adjacent the lower edge of the window glass outwardly so that when the second follower reaches the junction between the main track and the short inclined diversion track as the window approaches its upper closed position, the lower moves into the inclined diversion track. As a result, the lower edge of the window has a substantial component of outward motion as it moves into its uppermost position. This causes the outer surface of the lower portion of the glass to become substantially flush with the adjacent outer surface of the vehicle body or window.

At the same time the upper portions of the window glass is guided into a closed position in which its outer surface is also substantially flush with the adjacent outer surface of the vehicle body or window. Similarly the outer surfaces at front and rear edges of the window glass become substantially flush with the outer surfaces of the vehicle body or window adjacent thereto, as the lower portion is moved outwardly.

The means which biases the lower edge portion of the window glass outwardly comprises a generally vertical guide, a slide on the guide, and an arm pivoted at its lower end to the slide and pivoted at its upper end to the lower edge portion of the window. The pivoted arm is suitably inclined to the guide so that as the follower on the lower portion of the window reaches the junction between the main track and the short inclined diversion track, it is biased outwardly into the inclined diversion track. This causes the lower portion of the window to have a substantial outward component of motion as it reaches its uppermost position and to engage the inwardly facing surface of a seal to become substantially flush with the outer vehicle surfaces.

BRIEF DESCRIPTION OF THE DRAWINGS

FIG. 2 is a vertical section on the line 2—2, FIG. 1.

FIG. 3 is an enlarged fragmentary view of the window actuating slide.

FIG. 4 is a bottom view of the slide looking in the direction of the arrow 4, FIG. 3.

FIG. 5 is an edge view of the slide, looking in the dirction of the arrow 5, FIG. 3.

FIG. 6 is a fragmentary vertical section on the line 6—6, FIG. 1.

FIG. 7 is a vertical section on the line 7—7, FIG. 1.

FIG. 8 is an enlarged elevation of the upper follower, viewed in the direction of the arrows 8—8, FIG. 7.

FIG. 9 is a section on the line 9—9, FIG. 8.

FIG. 10 is an enlarged elevation of the lower follower, viewed in the direction of the arrows 10—10, FIG. 7.

FIG. 11 is a section on the line 11—11, FIG. 10.

COMPLETE DESCRIPTION

Figure 1:
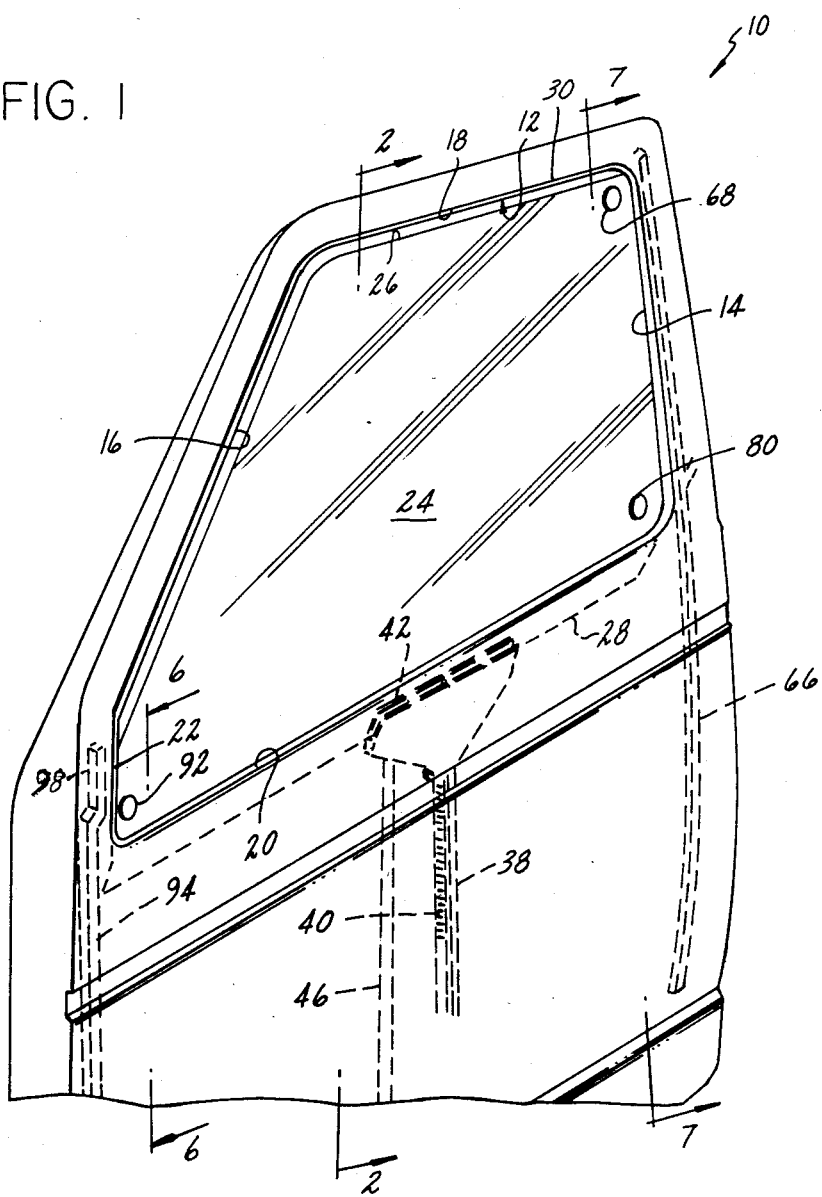
FIG. 1 is a generally diagrammatic perspective view of a portion of a vehicle door in which the invention is incorporated.

The invention is illustrated as applied to the door 10 of an automotive vehicle. The door as seen in FIG. 1 has a window opening 12 therein. As seen in this Figure, opening 12 has a generally vertical edge 14 of the full height of the opening 12, an inclined edge 16, a top edge 18, a bottom edge 20, and a short generally vertical edge 22 connecting the lower end of edge 16 to edge 20.

In this Figure, the window glass 24 is similarly shaped and its upper edge 26 is shown slightly below the fully closed position.

Figure 12:
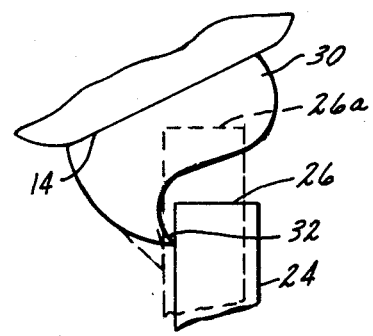
FIG. 12 is an enlarged diagrammatic view illustrating the seal at the top of the window.

The present invention is primarily concerned with controlling the movement of the lower edge 28 of the window, but as best illustrated in FIG. 12, it will be noted a resilient seal 30 is provided at the upper edge 14 of the window opening. Seal 30 has a tapered sealing lip 32 which engages the inside of the glass 24 as it moves from the full line, partially open position to the fully closed position indicated in dotted lines at 26a. Similar provision is made for sealing the side and inclined edges of the window.

Figure 13:
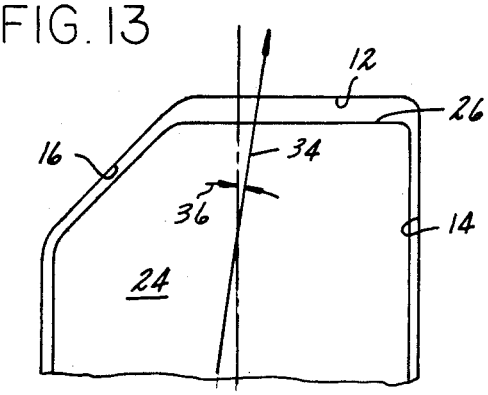
FIG. 13 is a diagrammatic view illustrating the direction of window movement.

As best seen in FIG. 13, the window glass 24 is guided by means later to be described to move in a path 34 slightly inclined with respect to the edge 14 of the opening. The inclination of path 34 is somewhat exaggerated, but the path 34 may be inclined such that angle 36 is about 4° or approximately an angle in between the angles made by the front edge of glass and rear edge of glass, in any case an angle which is a greater slope than the rear edge of glass to facilitate the glass moving away from the seals at the front and rear as the glass is lowered.

Opening and closing movement of the window is accomplished by actuating means of conventional type, such for example as that shown in Pickles U.S. Pat. No.

4,168,595 in which a flexible tape is guided along a functionally rigid but adjustably bendable guide, one end of the tape being connected to a slide or bracket fixed to the lower edge portion of the window. The flexible tape is illustrated in FIG. 1 at 38, and includes rack teeth 40 which at a point not shown in FIG. 1 are in mesh with a reversible drive gear or pinion.

In the present case, the actuator is seen at 42 in FIG. 1 and its detailed construction is illustrated in FIGS. 3-5.

The actuator comprises a slide 44, movable in a generally vertical but somewhat inclined path by spaced portions 45 slidable along a guide rod 46. As herein shown, the lower edge portion 48 of the glass 24 is bent inwardly, but alternatively a similarly bent bracket may be attached to the lower edge of the glass. A pivoted link plate 50 connects the glass 24 to the slide 44. Link 50 is pivoted to slide 44 at 52 and to a bracket 54 secured to the glass by pivot 56. As best seen in FIG. 5, link 50 is inclined upwardly and outwardly with respect to rod 46 so that while upward movement is imparted to slide 44, the angularity of the link 50 causes application of an outwardly directed component of force tending to rotate link plate 50 outwardly about its pivot 52.

The actual positions which the glass 24 assumes during its travel from its lowermost open position illustrated in full lines in FIG. 2 to its upper closed position illustrated in dotted lines at 24a, is determined by a system of tracks and followers, as will now be described. In the open position as seen in FIG. 2, the glass is housed completely in a cavity 60 provided between an outer door panel 62 and inner panel 64. Cavity 60 is open at its top to provide for movement of the glass into and out of the cavity.

In order to guide the glass during its movement with respect to inward or outward movement of different portions thereof, guide tracks in the form of elongated laterally open channels are provided. It will be understood that guide rod 46, slide 44, and pivot plate 50 determine the longitudinal position and orientation of the glass, as described in connection with FIG. 13.

The guide tracks which determine the lateral position of different portions of the window as it moves up and down comprise a main track 66 best seen in FIG. 7. Track 66 extends along the rear edge of the window opening from a position adjacent the top of the window opening to adjacent the bottom of the cavity 60. Adjacent the top of the window glass 24 at the rear edge thereof is an upper track follower assembly whose position is indicated at 68 in FIG. 1.

As best seen in FIGS. 7,8 and 9, the main track 66 is of channel shape, and its open side faces inwardly of the door, or longitudinally of the vehicle, and receives a vertically elongated follower 70 secured to an L-shaped arm 72. The window glass 24 is provided with an opening 74 through which arm 72 extends and the arm is clamped to the glass by a threaded plastic nut 76 cooperating with an abutment 78. It will be noted that follower 70 determines the lateral position of the glass at point 68, but is slidable in the relatively deep track 66 longitudinally of the vehicle. This permits follower 70 to move transversely of the slot in the guide channel as required by guidance of the slide 44 on rod 46.

However, an optional vertical rib 79 in component 70 can be guided by a matching depression in the channel 66, which is parallel to the guide rod side view angle, then additional fore and aft stability may be achieved.

The window glass is provided with a lower track follower assebmly whose position is indicated at 80 in FIG. 1.

As best seen in FIGS. 7, 10 and 11, the lower track follower comprises an L-shaped arm 82, one end 84 of which is of circular cross-section and is slidable longitudinally of main track 66 to control lateral displacement of the lower edge portion of the window as it is raised and lowered. Arm 82 is secured to the glass 24 adjacent the lower corner thereof below arm 72 by nut 83 corresponding to nut 76. Arm 82 may terminate in a ball, as indicated at 84a in FIG. 7.

The main guide track 66 is provided with a short upwardly and outwardly inclined diversion guide track 86. Guide 86 is also of channel shape and its interior channel communicates with the channel extending longitudinally of the main track 66.

The vertically elongated upper follower 70 moves along main guide track 66 and is prevented from entering diversion track 86 as it moves therepast from its lowermost position indicated at 70a to the upper position shown in FIG. 1. Accordingly, the upper edge 26 of the glass is guided generally vertically into sealing engagement with seal 30 as shown in FIG. 12.

Means are provided for biasing the follower 84 outwardly of the vehicle against the outer wall of the channel constituting the main guide track 66, so that when the follower 84 as it is moving upwardly reaches diversion track 86, it is diverted outwardly into the diversion track. Diversion track is effective to move the lower edge portion of the window outwardly into sealing engagement with an inwardly facing surface of seal 90, as best seen in FIG. 2. It will be observed in this Figure that the outer surface of the window glass in the upper position shown in broken lines at 24a is substantially flush with the outer surface of outer door panel 62, including seal 90. As is customary, door panel 62 and glass 24 are slightly curved in vertical cross-section but the two together provide a substantially smooth continuous vertically extending surface. The same condition exists at the top of the window as seen in FIG. 2, as well as at the sides thereof.

The means for biasing the lower edge portion of the window glass outwardly is the previously described pivoted link plate 50 connecting the actuator slide 44 to the bracket 54 carried by the lower edge portion of the window.

At the other edge of the window, a follower assembly provided at the position indicated at 92 in FIG. 1, which may be identical with the assembly including follower 84 of FIG. 11. In this case, a guide track 94 receives follower 96, and adjacent its upper end track 94 has an abruptly inclined portion 98 which cooperates with diversion track portion 86 and follower 84 in guiding the lower portion of window 24 outwardly into engagement with seal 90 and into flush relationship to the outer surface of outer door panel 62.

Overall, the movement of the window glass 24 as it moves upwardly toward closed position is in conformity with main guide tracks 66 and 94. However, during the final increment of upward movement, the diversion track 86 and track portion 98 cause the bottom portion of the window to move outwardly. This in effect rocks the window outwardly about a longitudinally extending generally horizontal axis determined by upper follower 70 moving the side and bottom edges of the window outwardly into sealing engagement with seal 90 and seals provided at the side edges of the window opening. The top edge of the glass is sealed as seen in FIG. 12. The result is that the entire outer surface of the door, including the window glass, is a substantially continuous smoothly curved surface.

From the foregoing, it will be apparent that the instantaneous orientation and position of different portions of the window is determined by separate guide structures. The guide rod 46 is rigid and slide 44 is maintained in exactly controlled positions thereon by widely spaced slide portions 45. While rod 46 is illustrated as straight, it may of course by slightly curved to accomodate the general curvature of the door and window. Since pivot plate 50 and bracket 54 have substantial width as best seen in FIG. 3, the orientation and position of the window longitudinally of the vehicle at all intermediate positions is accurately determined.

The separate means for determining the orientation and instantaneous position of different portions of the window transversely of the window as it is raised and lowered does not interfere with the operation of the first guide structure. It will be noted that channels 66,86 and 94 are relatively deep and that followers 70,84 and 96 while constrained by the side walls of the channels, are movable depthwise thereof as occassioned by operation of the regulating mechanism including the slide 44, guide rod 46, pivot plate 50 and bracket 54.

I claim:

1. A vehicle window construction comprising a generally continuous outer panel having a window opening therein defined by top, side and bottom edges, said panel forming the outer wall of a cavity for receiving a window glass movable into and out of said cavity through the bottom edge of said window opening, sealing means surrounding the window opening including a bottom seal having an inwardly facing sealing surface, guide means for guiding the upper edge of said window glass continuously upward into engagement with the sealing means at the upper edge of said window opening and for guiding the lower edge portion of said glass first upwardly into substantially closed position and then upwardly and laterally outwardly into sealing engagement with the inwardly facing sealing surface of said bottom seal to position the outer surface of the lower portion of said glass substantially flush with the outer panel surface beneath said window opening, said guide means comprising a main guide portion continuous from adjacent an upper corner of said window opening to a point within said cavity adjacent a lower corner of said glass when in fully lower position, said guide means having a separate short diversion guide portion connected to said guide portion intermediate its ends and angled upwardly and outwardly therefrom adjacent the lower edge of said opening, an upper follower carried by said glass adjacent an upper corner thereof and movable along said main guide portion and including means which prevents said upper follower from following said short diversion guide portion, a lower follower movable along said main guide portion below said short diversion guide portion and adapted to follow said short diversion guide portion, means connected to the lower edge of said window glass and adapted to raise said glass and to bias the lower edge of said glass outwardly to cause said lower follower to enter and follow said short diversion guide portions, said short diversion guide portion being shaped to move the lower edge of said glass outwardly into engagement with the inwardly facing sealing surface and to position the outer surface of said glass as a continuation of the outer surface of said panel beneath said window opening.

2. A vehicle window construction as defined in claim 1, in which said main and said diversion guide portions comprise interconnected channel tracks, said upper follower comprises a vertically elongated member shaped to prevent entry into the channel of said diversion guide portion, and said lower follower comprises a member shaped to permit entry into the trackway of said diversion guide portion.

3. A vehicle window construction as defined in claim 2 said channel tracks being shaped to provide channels of substantial depth, said followers being shaped to fit within said channels to provide positive guidance transversely of the channels and transversely of the vehicle, said followers being slidable depthwise of said channels to accomodate guidance of said glass and followers longitudinally of the vehicle by guidance means other than said channels.

4. A vehicle window construction as defined in claim 3, in which the guidance means other than said channels comprising window regulator mechanism including a generally vertical guide, a slide on said guide, a pivoted link connecting said slide to the bottom edge portion of said glass effective to determine the position of said glass longitudinally of the vehicle but to permit determination of the position of said glass transversely of the vehicle by said channel tracks and followers.

5. A vehicle window construction as defined in claim 1, which comprises actuating means including a member movable substantially vertically within said cavity, and in which the means biasing the lower edge of said glass outwardly comprises pivoted link means connecting said member to the bottom edge of said window to apply a lifting force to said window as said member is raised, said link means inclined upwardly and outwardly to provide an outward component of force to bias the lower edge of said window outwardly.

6. A vehicle window construction as defined in claim 5, said link means comprising a bracket fixed to the bottom edge of said window, and a rigid link pivoted at opposite ends to said member and to said bracket.

7. A vehicle window construction as defined in claim 6, in which said window opening has a first substantially vertical edge portion and an opposite edge portion inclined downwardly and away from said first edge portion, and guide means for guiding said member in a path slightly inclined downwardly and away from said first edge portion.

8. Vehicle window regulating mechanism comprising separate means for determining the instantaneous position of a window with respect to a window opening as the window is raised and lowered comprising a first guide structure including a generally vertical guide, a slide on said guide, a bracket rigidly fixed on the lower edge of said window, a pivot plate having pivots at upper and lower edges thereof connecting said slide to said bracket and to limit relative movement between said slide and window to pivot movement about the axes of said pivots to determine the orientation and instantaneous position of said window longitudinally of the vehicle as said window is raised and lowered, a second guide structure for determining the orientation and instantaneous position of different portions of said window laterally of said vehicle as said window is raised and lowered, said second guide structure comprising generally vertical guides and followers adapted to provide positive guidance between portions of said window laterally of the vehicle but providing relative motion between said guides and followers longitudinally of vehicle to provide for operation of said first guide structure without interference by said second guide structure.

9. Window regulating mechanism as defined in claim 8, in which said second guide structure comprises an elongated generally vertical main channel, a follower carried by said window and movable in said channel, said channel being relatively deep to provide for movement of said follower depthwise of said channel.

10. Window regulating mechanism as defined in claim 8, in which said second guide structure comprises an elongated generally vertical main channel, a follower carried by said window and movable in said channel, said channel and follower having a matching groove and rib parallel to said guide rod to increase fore and aft stability.

11. Window regulating mechanism as defined in claim 8, in which said second guide structure comprises an elongated generally vertical main channel, a short diversion channel connected to said main channel inclined upwardly and outwardly of the vehicle relative to said main channel adjacent the bottom of the window opening, an upper follower connected to said window adjacent an upper corner thereof and movable in said main channel from a position below said diversion channel to adjacent the top of said main channel, said upper follower being shaped to prevent entry into said diversion channel, a lower follower connected to said window adjacent the lower corner thereof beneath said upper followers, said lower follower being dimensioned to permit entry into said diversion channel on upward movement thereof, said pivot plate constituting means for biasing the lower portion of said window outwardly of the vehicle to cause said lower follower to enter said diversion channel and to thereby move the lower portion of said window outwardly into substantially flush relation to the outer surfaces surrounding said window opening as it reaches its uppermost position.

* * * * *